Sept. 29, 1959   C. M. TANNER   2,906,412
FOOD TRAY
Filed May 24, 1956

Clarence M. Tanner
INVENTOR.

BY Robert J. Path
ATTORNEY

United States Patent Office 2,906,412
Patented Sept. 29, 1959

2,906,412

FOOD TRAY

Clarence M. Tanner, Claremore, Okla.

Application May 24, 1956, Serial No. 587,166

2 Claims. (Cl. 211—74)

The present invention relates to safety trays, and more particularly to trays adapted to hold a plurality of food receptacles such as dishes and the like and to catch liquids and foods which may be spilled from the dishes.

It is an object of the invention to provide a safety tray which will hold dishes firmly against tilting or sliding.

Another object of the invention is the provision of a safety tray which may be easily cleaned.

Still another object of the invention is the provision of a safety tray which will catch and retain spilled foods and liquids.

The invention also contemplates the provision of a safety tray having removable legs such that when the legs are detached from the tray, the tray will have a smooth and flat bottom.

Finally, it is an object of the present invention to provide a safety tray which will be simple and inexpensive to manufacture, reliable in operation, and rugged and durable in use.

Other objects and advantages of the present invention will become apparent from the following specification, taken in conjunction with the accompanying drawing, in which.

Figure 1:
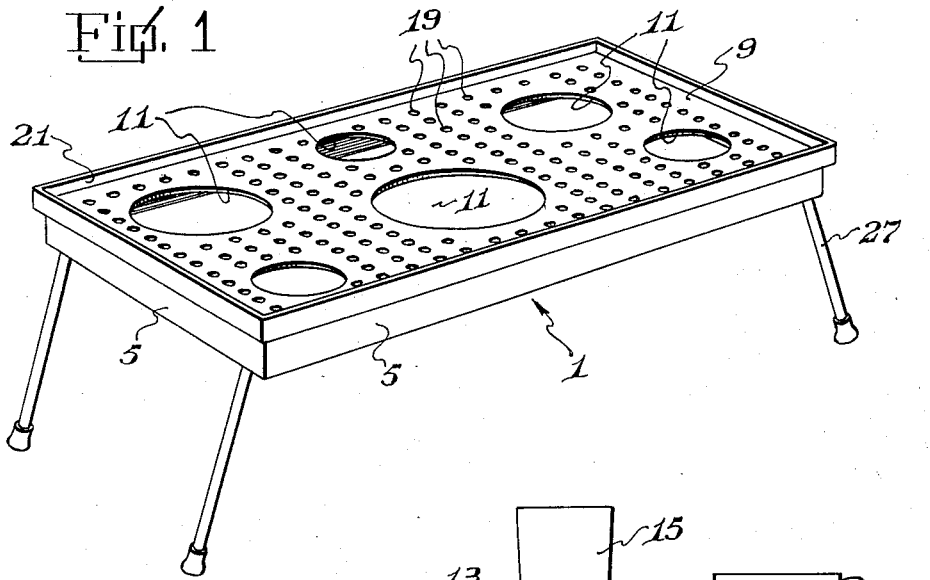
Figure 1 is a perspective view of a safety tray according to my invention.

Referring now to the drawings in greater detail, there is shown a safety tray indicated generally at 1 and comprising a rectangular lower panel 3 provided at its edges with shallow upstanding side walls 5 terminating at their upper edges in an outwardly extending ledge 7.

Figure 2:
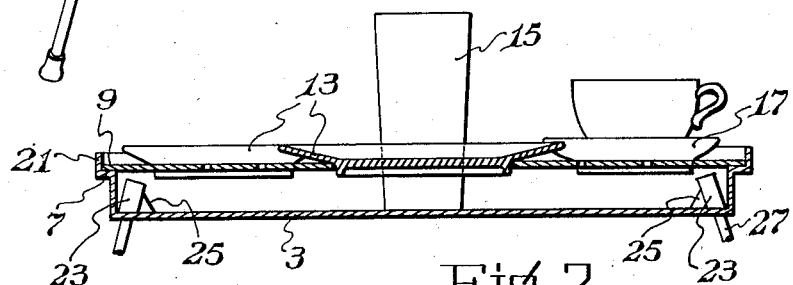
Figure 2 is an elevational cross-sectional view of the invention, showing dishes in place, taken on the line 2—2 of Figure 3.
Figure 3:
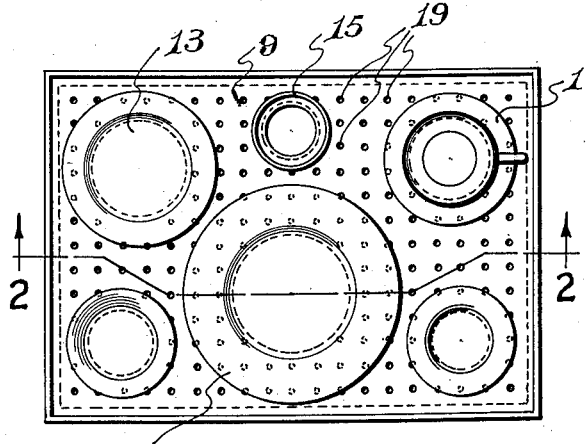
Figure 3 is a plan view of the invention with dishes in place.
Figure 4:
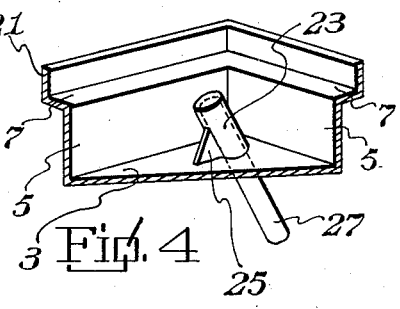
Figure 4 is a broken away perspective view of a corner of the tray showing the attachment of a leg.

A rectangular upper panel of greater lateral extent in both dimensions than lower panel 3 is indicated at 9. Upper panel 9 is removably supported by and rests by gravity on ledge 7 parallel to and spaced above lower panel 3. Upper panel 9 has a plurality of relatively large apertures 11 therethrough for the reception of dishes 13 and the like. As seen in Figure 2, a dish such as water glass 15 extends through its associated aperture 11 and rests on lower panel 3; while a dish such as saucer 17 rests on the upper marginal edge of its associated aperture 11 and does not extend much below upper panel 9.

Upper panel 9 is also provided with a multiplicity of relatively small apertures 19 extending therethrough for the passage of spilled liquids and small pieces of food down onto lower panel 3. For example, if a liquid should be spilled from glass 15, it would immediately pass through apertures 19 and be retained in the sump provided by lower panel 3 and side walls 5. Means are provided on the outer edges of ledge 7, comprising an upstanding edge 21. The purpose of edge 21 is to maintain upper panel 9 against lateral displacement and to catch pieces of food too large to pass through relatively small apertures 11. For example, if a piece of bread should slide off one of the plates, it would not pass through apertures 19 but would slide across upper panel 9 and be caught by upstanding edge 21. Thus, edge 21 performs the dual function of catching food and maintaining upper panel 9 against lateral displacement.

A plurality of downwardly opening sockets 23 extend upwardly from lower panel 3 but terminate short of upper panel 9 and are disposed entirely within the space bounded by panels 3 and 9 and side walls 5 and are spaced inwardly from side walls 5 adjacent each corner of lower panel 3. Sockets 23 are inclined generally upwardly inwardly; and each is reinforced with a bracing web 25 disposed along that line of socket 23 which forms the least angle with the upper surface of lower panel 3. Thus, bracing webs 25 are triangular; and the angle at the intersection of socket 23 and panel 3 is acute. A removable leg 27 is removably insertable at its upper end in each socket 23.

It will be evident that my novel tray may be cleaned simply by lifting out upper panel 9 and removing any food or liquid which may have passed below panel 9. My novel tray may also be used on its removable legs 27, or, when legs 27 are removed, may be used as a tray which presents a flat bottom surface.

Thus, it will be obvious that I have achieved all of the initially recited objects of my invention.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A food tray comprising in combination a rectangular lower panel, four sidewalls upstanding from the edges of said panel, a ledge extending outwardly from the upper edges of said four sidewalls, a thin flat rectangular upper panel of greater lateral extent than said lower panel removably supported on said ledge parallel to and spaced above said lower panel, said upper panel having a plurality of relatively large apertures therethrough for reception of dishes and the like and a multiplicity of relatively small apertures therethrough for the passage of liquid and small pieces of food down onto said lower panel, and an edge upstanding from the four outer edges of said ledge and extending a substantial distance above the upper surface of said thin flat upper panel to maintain said upper panel against lateral displacement and to catch pieces of food too large to pass through said relatively small apertures.

2. A food tray comprising in combination a lower panel, sidewalls upstanding from the edges of said panel, a ledge extending outwardly from the upper edges of said sidewalls, an upper panel of greater lateral extent than said lower panel removably supported on said ledge parallel to and spaced above said lower panel, said upper panel having a plurality of apertures therethrough for the reception of dishes and the like, means upstanding from the outer edges of said ledge to maintain said upper panel against lateral displacement, a plurality of downwardly opening sockets extending upwardly from said lower panel but terminating short of said upper panel and disposed entirely within the space bounded by said panels and sidewalls, said sockets opening through the bottom surface of said lower panel, the marginal edges of the socket openings being flush with said bottom surface of the lower panel, and a leg removably insertable at its upper end in each said socket.

References Cited in the file of this patent

UNITED STATES PATENTS

| | | |
|---|---|---|
| 818,004 | Thornton | Apr. 17, 1906 |
| 958,857 | Dennis | May 24, 1910 |
| 1,243,173 | Hinckley | Oct. 16, 1917 |
| 1,569,157 | Thompson | Jan. 12, 1926 |
| 1,738,429 | Heyman | Dec. 3, 1929 |
| 1,770,500 | Wege | July 15, 1930 |
| 2,014,745 | Regli | Sept. 17, 1935 |
| 2,080,865 | Lassiter | May 18, 1937 |
| 2,296,028 | Gribble | Sept. 15, 1942 |
| 2,695,712 | Kolander | Nov. 30, 1954 |
| 2,723,037 | Matesic | Nov. 8, 1955 |